US006791796B2

(12) United States Patent
Shukh et al.

(10) Patent No.: US 6,791,796 B2
(45) Date of Patent: Sep. 14, 2004

(54) PERPENDICULAR WRITER WITH LAMINATED MAIN POLE

(75) Inventors: Alexander Mikhailovich Shukh, Savage, MN (US); Vladyslav Alexandrovich Vaśko, Minneapolis, MN (US); Declan Macken, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 76 days.

(21) Appl. No.: 10/259,133

(22) Filed: Sep. 27, 2002

(65) Prior Publication Data

US 2004/0004786 A1 Jan. 8, 2004

Related U.S. Application Data

(60) Provisional application No. 60/383,568, filed on May 28, 2002.

(51) Int. Cl.[7] .............................. G11B 5/31; G11B 5/147
(52) U.S. Cl. ........................................ 360/126; 360/125
(58) Field of Search .................................. 360/126, 125

(56) References Cited

U.S. PATENT DOCUMENTS

| | | | | |
|---|---|---|---|---|
| 5,132,859 A | * | 7/1992 | Andricacos et al. | 360/126 |
| 5,157,570 A | * | 10/1992 | Shukovsky et al. | 360/126 |
| 5,196,976 A | | 3/1993 | Lazzari | |
| 5,621,592 A | | 4/1997 | Gill et al. | 360/113 |
| 5,864,450 A | | 1/1999 | Chen et al. | 360/113 |
| 5,966,800 A | | 10/1999 | Huai et al. | 29/603.13 |
| 6,072,671 A | | 6/2000 | Gill | 360/126 |
| 6,163,442 A | | 12/2000 | Gill et al. | 360/317 |
| 6,292,334 B1 | | 9/2001 | Koike et al. | 360/319 |
| 6,393,692 B1 | | 5/2002 | Ju et al. | 29/603.14 |
| 6,628,478 B2 | * | 9/2003 | Gill | 360/126 |
| 2002/0131203 A1 | * | 9/2002 | Litvinov et al. | 360/125 |
| 2003/0076627 A1 | * | 4/2003 | Minor et al. | 360/125 |
| 2003/0197976 A1 | * | 10/2003 | Van der Heijden et al. | 360/125 |

FOREIGN PATENT DOCUMENTS

EP 0301823 A2 2/1989

OTHER PUBLICATIONS

*Introduction To Solid State Physics, Seventh Edition*, By Charles Kittel, pp. 628–629 (1996).

* cited by examiner

*Primary Examiner*—Craig A. Renner
(74) *Attorney, Agent, or Firm*—Kinney & Lange, P.A.

(57) ABSTRACT

The present invention is a perpendicular writer having an air-bearing surface, a main pole with an extension, and return pole, and a back gap closure intermediate the main pole extension and the return pole. The main pole includes a top magnetic layer and a soft magnetic underlayer separated by a nonmagnetic spacer. The main pole extension is in direct contact with the main pole and recessed from the air-bearing surface. The top magnetic layer forms a trailing edge of the main pole at the ABS and has a magnetic moment greater than that of the soft magnetic underlayer. Further, the top magnetic layer and the soft magnetic underlayer are antiferromagnetically coupled through the thin nonmagnetic spacer. The nonmagnetic spacer has predominantly 111-crystalline texture and promotes reduction of coercivity and grain size along with an increase of anistropy of the top magnetic layer material.

20 Claims, 4 Drawing Sheets

PERPENDICULAR WRITER WITH LAMINATED MAIN POLE

CROSS-REFERENCE TO RELATED APPLICATION

This application claims priority from provisional U.S. Patent Application Serial No. 60/383,568, filed on May 28, 2002 for "Perpendicular Writer with Magnetically Soft and Stable High Magnetic Moment Main Pole" by Alexander Mikhailovich Shukh, Vladyslav Alexandrovich Vas'ko, and Declan Macken.

FIELD OF THE INVENTION

The present invention relates generally to the field of electronic data storage and retrieval, and more particularly to a perpendicular magnetic writer with a magnetically soft and stable high magnetic moment main pole.

BACKGROUND OF THE INVENTION

Perpendicular recording potentially can support much higher linear density than longitudinal recording due to lower demagnetizing fields in recorded bits, which diminish with linear density increase. To provide decent writeability, double layer media are used. The double layer perpendicular media consist of a high coercivity, thin storage layer with perpendicular to-plane anisotropy and a soft magnetic keeper (underlayer) having in-plane anisotropy and relatively high permeability.

A magnetic head for perpendicular recording generally consists of two portions, a writer portion for storing magnetically-encoded information on a magnetic media (disc) and a reader portion for retrieving that magnetically-encoded information from the media. The reader portion typically consists of a bottom shield, a top shield, and a sensor, often composed of a magnetoresistive (MR) material, positioned between the bottom and top shields. Magnetic flux from the surface of the disc (media) causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the data that was encoded on the disc.

The writer portion of the magnetic head for perpendicular recording typically consists of a main pole and a return pole which are magnetically separated from each other at an air bearing surface (ABS) of the writer by a nonmagnetic gap layer, and which are magnetically connected to each other at a region distal from the ABS by a back gap closure. Positioned at least partially between the main and return poles are one or more layers of conductive coils encapsulated by insulating layers. The ABS is the surface of the magnetic head immediately adjacent to the perpendicular medium. The writer portion and the reader portion are often arranged in a merged configuration in which a shared pole serves as both the top or bottom shield of the reader portion and the return pole of the writer portion.

To write data to the magnetic medium, an electrical current is caused to flow through the conductive coil, thereby inducing a magnetic field across the write gap between the main and return poles. By reversing the polarity of the current through the coil, the polarity of the data written to the magnetic media is also reversed. Data on double layer perpendicular media are recorded by a trailing edge of the main pole. Accordingly, it is the main pole that defines the track width of the written data. More specifically, the track width is defined by the width of the main pole at the ABS.

The main and return poles are made of a soft magnetic material. Both of them generate magnetic field in the media during recording when the write current is applied to the coil. However, the main pole produces much stronger write field than the return pole by having a much smaller sectional area the ABS and being made of magnetic material with higher magnetic moment. A magnetic moment of the main pole should be oriented along an easy axis parallel to the ABS when the main pole is in a quiescent state, namely without a write current field from the write coil. When the magnetic moment does not return to an orientation parallel to the ABS after being subjected to multiple instances of the write current field, the main pole is not stable. In an unstable pole, the orientation of the magnetic moment might remain nonparallel to the ABS position even after current to the write coil is turned off. Thus, the main pole may form a magnetic flux and may deteriorate or even erase data from the disc. Further, an unstable pole results in increased switching time when a current is applied. In a perpendicular head for ultra-high track density recording, the main pole is a predominant source of instability due to a strong demagnetizing field across the pole width at the ABS and the necessity of using magnetic materials with the highest possible values of magnetic moment saturation, even though these materials have poor anisotropy and relatively high coercivity.

A factor bearing upon the magnetic stability of the main pole and the return of its magnetic moment to an orientation parallel to the ABS is its uniaxial anisotropy. Uniaxial anisotropy is a measure of an amount of applied magnetic field required to rotate the magnetic moment of the main pole from the orientation parallel to the ABS to an orientation perpendicular to the ABS. If the uniaxial anisotropy is too low and the coercivity is high enough, the magnetic moment in the main pole may not always return to a position parallel to the ABS after a write current is removed. Thus, the erasure of recorded data on perpendicular media is likely.

Strength of the write field in the media is proportional to the magnetic moment of the main pole material. It is desirable to use a material with a high magnetic moment saturation (or high flux density saturation) for construction of the main pole in heads for ultra high track density recording. Accordingly, when the magnetic moment saturation of the main pole material is increased, a track width of the main pole tip can be reduced for increasing the storage capability of the disc drive. An example of a material with a high magnetic moment is an alloy of iron and cobalt (FeCo). The CoFe-alloy will conduct a large amount of flux and thereby permit the use of a very narrow pole tip, resulting in a very narrow track width, thereby allowing for ultra-high recording densities. Unfortunately, while CoFe films have the highest magnetic moment saturation, they do not have good magnetic stability due to poor anisotropy and relatively high coercivity. This means that the magnetic moment might not return to the parallel position to the ABS after being subjected to multiple instances of the write current field in the main pole tip of submicron width.

Accordingly, there is a strong-felt need to provide a writer which is magnetically stable and is made of material with high magnetic moment saturation. Such a stable writer will reduce switching time, increase a drive's data rate, and prevent unintentional erasing on perpendicular media after the write current is turned off.

BRIEF SUMMARY OF THE INVENTION

The present invention is a perpendicular writer having an air-bearing surface, a main pole with a main pole extension, and return pole, and a back gap closure intermediate the main pole extension and the return pole. The main pole extension is in direct contact with the main pole and recessed from the air-bearing surface to prevent erasure of recorded data on adjacent tracks. The main pole includes a top magnetic layer, a soft magnetic underlayer and a nonmagnetic spacer placed in-between. The top magnetic layer forms a trailing edge of the main pole at the ABS and has a magnetic moment greater than that of the soft magnetic underlayer. The soft magnetic underlayer is in direct contact with the main pole extension made of magnetic material with low coercivity, high anisotropy, and high permeability. Further, the top magnetic layer and soft magnetic underlayer are antiferromagnetically coupled through the thin nonmagnetic spacer. The nonmagnetic spacer has predominantly 111-crystalline texture and promotes reduction of coercivity and grain size along with an increase of anisotropy of the top magnetic layer material.

DETAILED DESCRIPTION OF THE PREFERRED EMBODIMENTS

Figure 1:
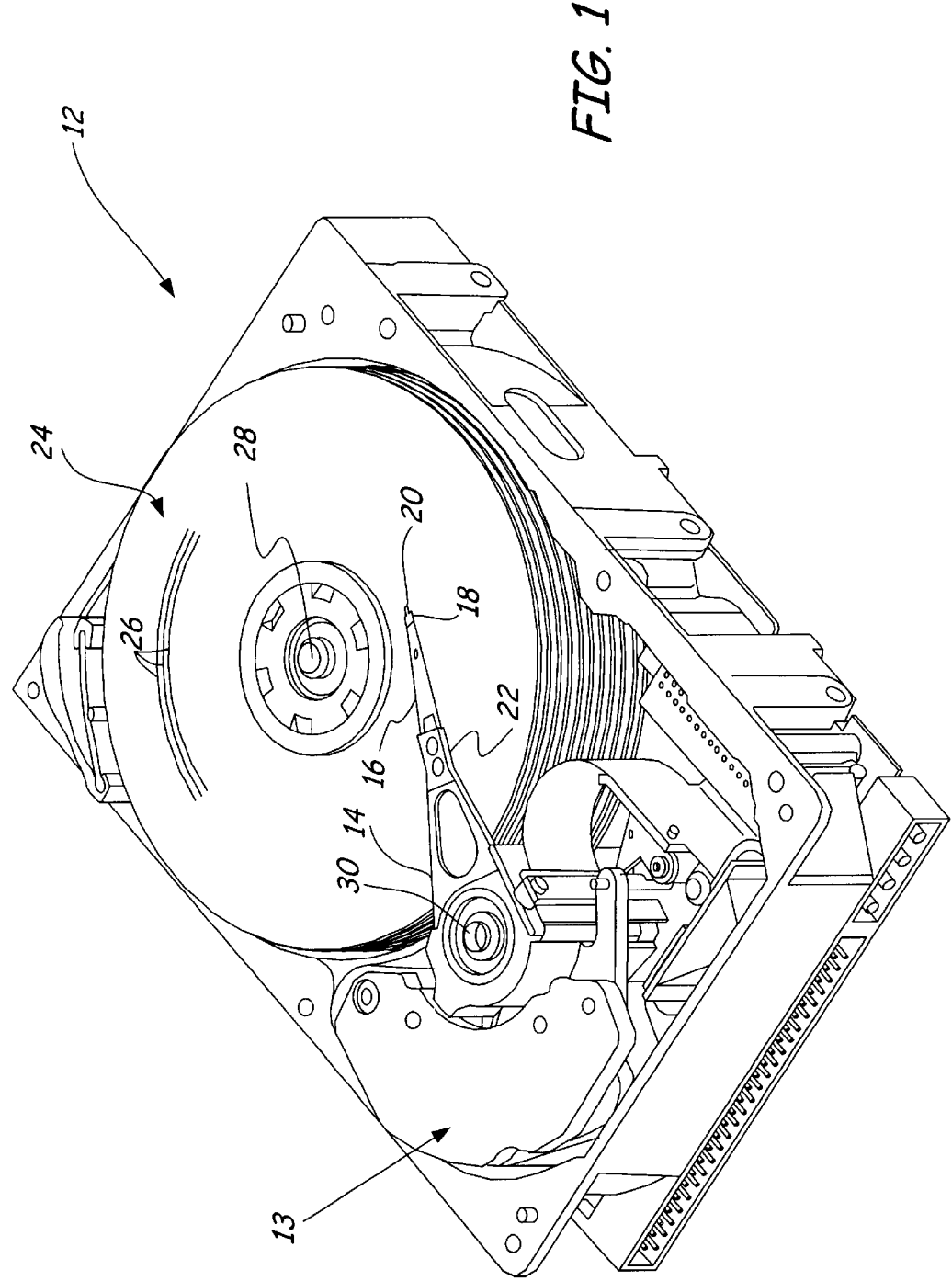
FIG. 1 shows a top perspective view of a disc drive.

FIG. 1 shows a top perspective view of a disc drive 12, which includes a voice coil motor (VCM) 13, actuator arm 14, suspension 16, flexure 18, slider 20, head mounting block 22, and disc or media 24. Slider 20 is connected to the distal end of suspension 16 by flexure 18. Suspension 16 is connected to actuator arm 14 at head mounting block 22. Actuator arm 14 is coupled to VCM 13. As shown on the right side of FIG. 1, disc 24 has a multiplicity of tracks 26 and rotates about axis 28.

During operation of disc drive 12, rotation of disc 24 generates air movement which is encountered by slider 20. This air movement acts to keep slider 20 aloft a small distance above the surface of disc 24, allowing slider 20 to fly above the surface of disc 24. VCM 13 is selectively operated to move actuator arm 14 around axis 30, thereby moving suspension 16 and positioning the transducing head (not shown) carried by slider 20 over tracks 26 of disc 24. Proper positioning of the transducing head is necessary for reading and writing data on concentric tracks 26 of disc 24.

Figure 2:
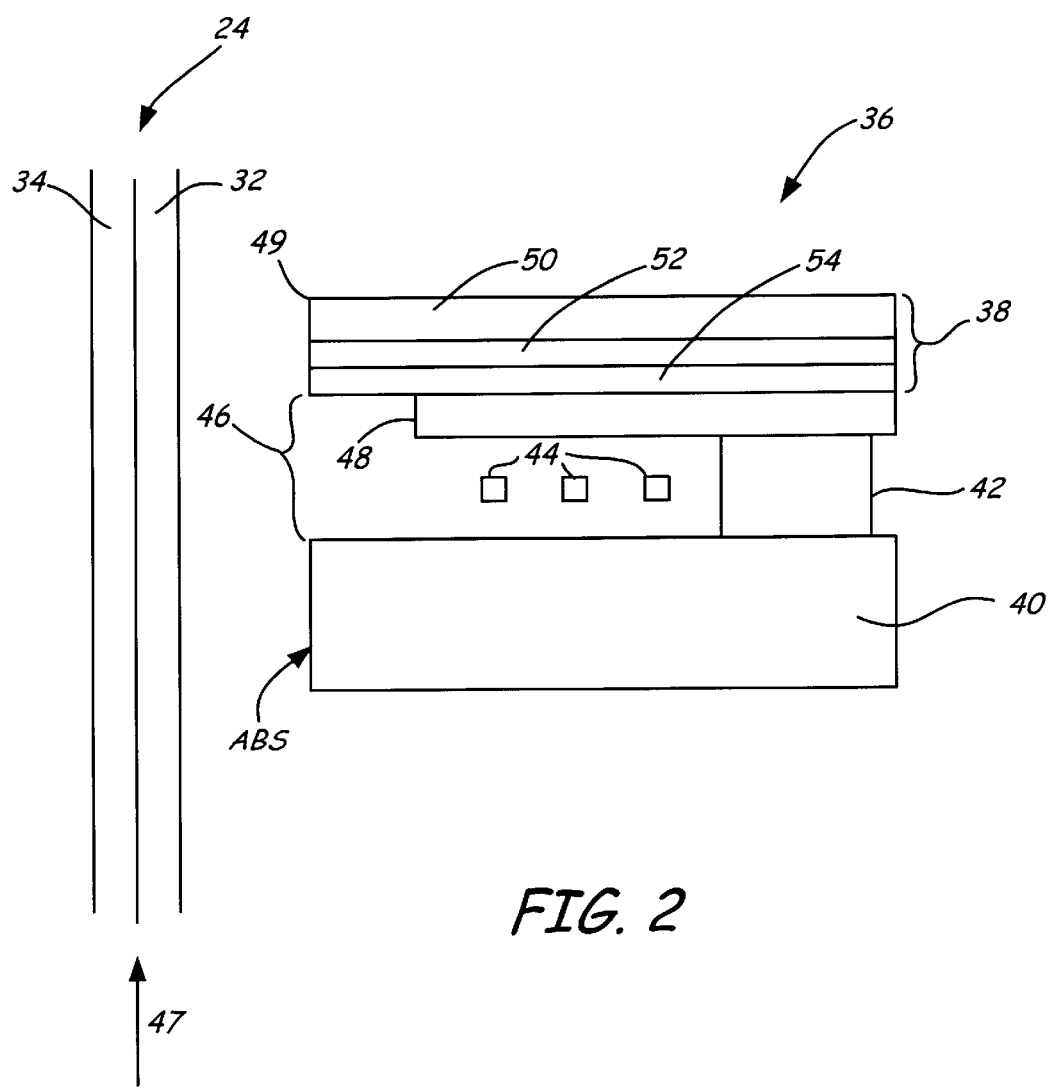
FIG. 2 is a cross-sectional view of a first embodiment of the perpendicular writer of the present invention.

FIG. 2 is a cross-sectional view of a first embodiment of perpendicular writer 36 of the present invention. Medium 24 for perpendicular recording comprises thin storage layer 32 having high coercivity and perpendicular anisotropy (the magnetization is held in a direction substantially normal to the surface of medium 24) and soft magnetic underlayer or keeper 34 having high permeability and in-plane orientation of the easy axis. Writer 36 comprises main pole 38, main pole extension 48 and return pole 40, connected to each other by back gap closure 42 at a distal end and separated from each other by write gap 46 at the ABS and write coil 44 positioned between main pole extension 48 and return pole 40. Main pole 38 serves as a trailing pole for the given direction of motion 47 of medium 24. Magnetization transitions on medium 24 are recorded by trailing edge 49 of main pole 38. To provide decent write field strength in medium 24, magnetic layer 50, shown here as the top layer, of main pole 38 containing trailing edge 49 is made of a high magnetic moment material. Main pole 38 has a submicron width at the ABS, to provide recording of ultra-narrow tracks on medium 24. Moreover, the proposed structure of main pole 38 increases the uniaxial anisotropy of top magnetic layer 50, thereby rendering it more magnetically stable.

To write data to perpendicular magnetic medium 24, a time-varying write current is caused to flow through coil 44, which in turn produces a time-varying magnetic field through main pole 38 and return pole 40. Medium 24 is then passed by the ABS of writer 36 at a predetermined distance such that medium 24 is exposed to the magnetic field. With perpendicular writer 36, the soft magnetic keeper 34 of magnetic medium 24 in essence acts as a third pole of the writer.

A closed magnetic path for flux from writer 36 to medium 24 travels from main pole 38 through storage layer 32 of medium 24 to soft magnetic keeper 34 and returns to writer 36 through return pole 40, again passing through storage layer 32. To ensure that the magnetic field does not write data on this return path, the surface area of return pole 40 at the ABS is preferably substantially larger than the surface area of main pole 38 at the ABS. Thus, the strength of the magnetic field affecting storage layer 32 under return pole 40 will not be sufficient to overcome a nucleation field of storage layer 32. In a preferred embodiment, the thickness of main pole 38 is between about 0.05 and about 1 micrometer.

Main pole 38 preferably has a multilayer structure and is preferably formed on main pole extension 48. Multilayer main pole 38 preferably comprises magnetic layer 50, shown here as top magnetic layer 50, made of high magnetic moment material; thin nonmagnetic spacer layer 52; and magnetic layer 54, shown here as underlayer 54, made of a soft magnetic material with well-defined anisotropy. This multilayer pole structure induces anisotropy in top magnetic layer 50 parallel to the ABS direction, thereby enhancing the magnetic stability of main pole 38 while retaining the high writeability and high data rate advantages of the high magnetic moment material use. When top magnetic layer 50 is coupled with soft magnetic underlayer 54 across nonmagnetic layer 52 according to the present invention, the properties of the coupled multilayer system improve the performance of main pole 38 compared with a main pole made of a single layer of high magnetic moment material. While the layers of writer 36 are illustrated as planar layers, it is contemplated that they may follow other contours. Additionally, the illustrations are not rendered to scale.

Any suitable material with a high magnetic moment may be used for top magnetic layer 50. In a preferred embodiment, an Fe-Co alloy with Co content in the range of about 30 to about 50 percent is used. This alloy possesses a saturation moment of about 2.4 Tesla. Top magnetic layer 50 can be of any suitable thickness for use in writer 36; it is preferably about 0.05 to about 1 micrometer thick, and more preferably about 0.1 to about 0.5 micrometer thick.

Any suitable material with a magnetic moment lower than the magnetic moment of the material of top magnetic layer 50 may be used for magnetic underlayer 54. This material is also preferably magnetically soft, with a preferred coercivity less than about 5 Oersted and more preferably less than about 1 Oersted. The material used for magnetic underlayer 54 preferably has a lower coercivity than the material used for top magnetic layer 50. The chosen material preferably has well defined magnetic anisotropy, meaning that it has a stable orientation of the easy axis of magnetization parallel to the ABS. In a preferred embodiment, magnetic underlayer 54 is made of CoNiFe, FeCoN, CoNiFeN, FeAlN, FeTaN, FeN, NiFe (e.g. $Ni_{80}Fe_{20}$, $Ni_{45}Fe_{55}$, etc.), NiFeCr, NiFeN, CoZr, CoZrNb, FeAlSi, or another suitable material. Magnetic underlayer 54 preferably has a saturation moment less than about 2 Tesla, more preferably less than about 1.5 Tesla and most preferably less than about 1.0 Tesla. It is noted that while the material of magnetic underlayer 54 has a lower magnetic moment relative to that of top magnetic layer 50, the material of magnetic underlayer 54 may still be what is considered a high magnetic moment material in absolute terms. Magnetic underlayer 54 can be of any suitable thickness but is preferably less than about 0.2 micrometer thick and more preferably less than about 0.05 micrometer thick.

Nonmagnetic spacer 52 may be composed of any nonmagnetic material which is mechanically and chemically compatible with the magnetic materials used for top magnetic layer 50 and magnetic underlayer 54. Copper (Cu) or Ruthenium (Ru) are used for nonmagnetic spacer 52 in a preferred embodiment in which top magnetic layer 50 is made of FeCo and magnetic underlayer 54 is made of $Ni_{80}Fe_{20}$. The use of nonmagnetic spacer 52 between top magnetic layer 50 and magnetic underlayer 54 results in formation of an antiferromagnetic (AFM) exchange coupling between top magnetic layer 50 and magnetic underlayer 54. This coupling induces anisotropy in top magnetic layer 50 oriented parallel to the ABS, resulting in a more magnetically stable domain structure of top magnetic layer 50, and as a result, a more stable main pole 38 due to a reduction in magnetic energy.

According to the RKKY (Ruderman-Kittel-Kasuya-Yosida) interaction, nonmagnetic spacer 52 induces a periodic coupling between top magnetic layer 50 and magnetic underlayer 54. The coupling alternates in quality between antiferromagnetic and ferromagnetic as a function of the thickness of nonmagnetic spacer 52 and depends upon the crystallographic orientation of the material of nonmagnetic spacer 52. In a preferred embodiment with top magnetic layer 50 made of $Fe_{60}Co_{40}$ and magnetic underlayer 54 made of $Ni_{80}Fe_{20}$, it is preferable that the material of nonmagetic spacer 52 has a 111-crystalline orientation. Suitable nonmagnetic materials include, for example, copper, ruthenium, gold, copper-silver alloys, and various oxides, including aluminum oxide and silicon dioxide. Preferred nonmagnetic materials are those which provide for antiferromagnetic exchange coupling between the adjacent magnet layers, such as copper, ruthenium, gold, and copper-silver alloys. It is contemplated that nonmagnetic materials of other crystalline orientations may be chosen to correspond with other choices in magnetic materials for top magnetic layer 50 and magnetic underlayer 54.

In a preferred embodiment, the thickness of nonmagnetic spacer 52 is chosen to maximize the antiferromagnetic quality of the coupling between top magnetic layer 50 and magnetic underlayer 54. If the thickness corresponding to the first antiferromagnetic peak results in a nonmagnetic spacer which is too thin to be practical, then the thickness of nonmagnetic spacer 52 corresponding to the next antiferromagnetic peak can be used, and so on. In one embodiment, Cu or Ru spacer 52 has a thickness of about 5 to about 200 Angstroms (Å), more preferably a thickness of about 6 to about 30 Å, and most preferably a thickness of about 18 to about 25 Å.

In the present invention, nonmagnetic spacer 52 serves not only to antiferromagnetically couple top magnetic layer 50 and magnetic underlayer 54, but also to magnetically soften top magnetic layer 50 made of CoFe-alloy. The quantum interactions between the atoms at the interfacing surfaces of top magnetic layer 50 and nonmagnetic spacer 52 change the crystalline texture of top magnetic layer 50, resulting in reduced grain size, decreased coercivity, increased anisotropy, and greater magnetic stability.

Any suitable material may be used for main pole extension 48, which is used in one embodiment to increase efficiency of writer 36, as well as enhance the anisotropy and structural and magnetic integrity of multilayer main pole 38. Extension 48 is preferably recessed from the ABS by a distance of about 0.2 to about 2 micrometers so that extension 48 does not contribute to an increased track width of main pole 38 at the ABS. A narrow track width of main pole 38 at the ABS allows for high track density recording and prevents skew-related side writing effects.

In one embodiment, main pole extension 48 is made of a magnetic material such as CoNiFe, FeCoN, CoNiFeN, FeAlN, FeTaN, FeN, NiFe (e.g. $Ni_{80}Fe_{20}$, $Ni_{45}Fe_{55}$, etc.), NiFeCr, NiFeN, CoZr, CoZrNb, CoZrTa, FeAlSi, or other suitable materials. The chosen material preferably has well defined magnetic anisotropy, meaning that it has well defined easy and hard magnetic axes. The material is preferably magnetically soft, with a preferred coercivity less than about 5 Oersted and more preferably less than about 1 Oersted. Extension 48 preferably has a relative magnetic permeability more than about 500, and more preferably more than about 1000. In such an embodiment, main pole extension 48 also serves as an extension of magnetic underlayer 54 due to strong ferromagnetic coupling between them, thereby contributing to the antiferromagnetic coupling with top magnetic layer 50. However, because extension 48 is preferably shorter than magnetic underlayer 54, it is not exposed at the ABS and thus reduces skew-related effects on medium 24. Thus, extension 48 can be as thick as necessary to effectively contribute to the magnetic stability of top magnetic layer 50 and magnetic underlayer 54. Thickness of main pole extension 48 is preferably in a range from about 0.1 to about 2 micrometers. In a preferred embodiment, extension 48 is made of the same material as magnetic underlayer 54. In an alternate embodiment, extension 48 is omitted.

Any suitable magnetic material may be used for back gap closure 42. In a preferred embodiment, back gap closure 42 is constructed of a soft magnetic material such as CoNiFe, NiFe, $Ni_{80}Fe_{20}$, $Ni_{45}Fe_{55}$, NiFeCr, CoZr, FeN, FeAlSi, or other suitable materials.

Figure 3:
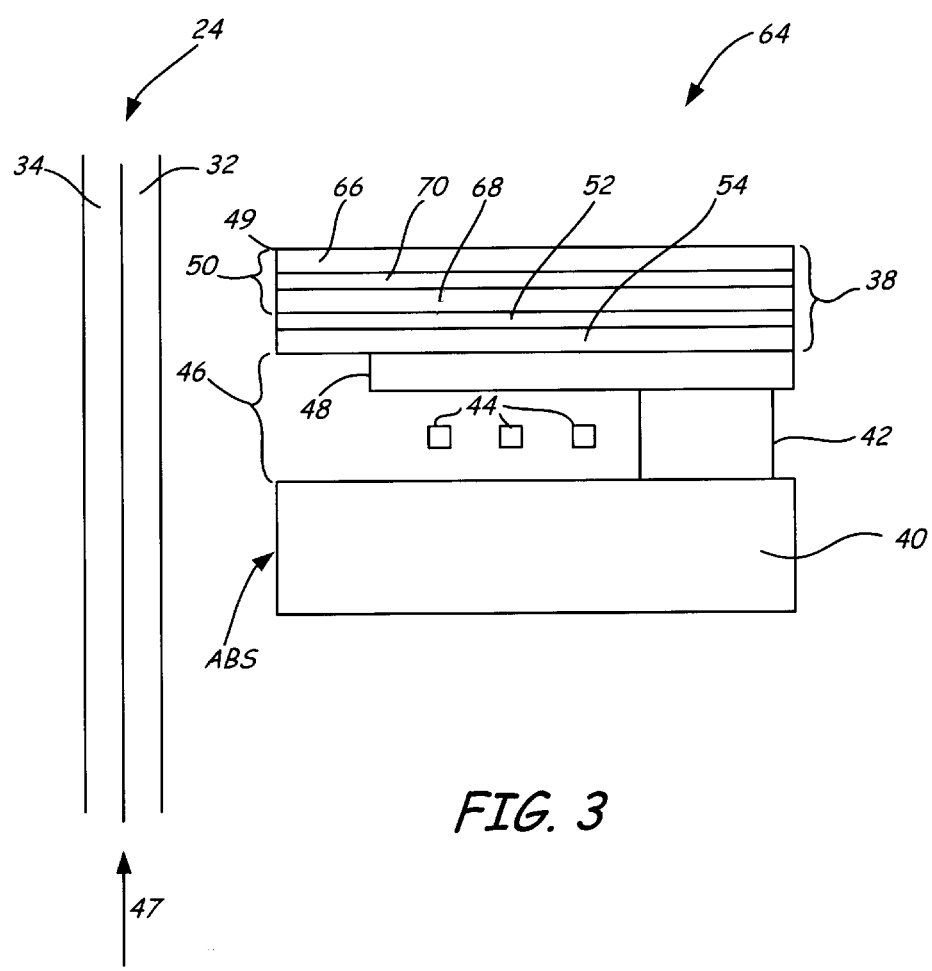
FIG. 3 is a cross-sectional view of a second embodiment of the perpendicular writer of the present invention.

FIG. 3 is a cross-sectional view of a second embodiment of the perpendicular writer 64 of the present invention. Compared to the embodiment of FIG. 2, the embodiment of FIG. 3 has a laminated top magnetic layer 50. In one embodiment, top magnetic layer 50 is composed of two magnetic sublayers 66 and 68, spaced from each other by nonmagnetic layer 70. Magnetic sublayers 66 and 68 are made of FeCo, magnetic underlayer 54 is made of NiFe or CoNiFe, and nonmagnetic spacer 52 and nonmagnetic layer 70 are composed of Cu. Other suitable materials may also be used, as described with reference to FIG. 2 above. Magnetic sublayer 66 maybe composed of the same material as sublayer 68, or they may be composed of different materials. Similarly, nonmagnetic spacer 52 may be composed of the same material as nonmagnetic layer 70, or they may be composed of different materials.

As in the embodiment illustrated in FIG. 2, top magnetic multilayer 50 is antiferromagnetically coupled with magnetic underlayer 54 through nonmagnetic spacer 52. Moreover, magnetic sublayers 66 and 68 are antiferromagnetically coupled to each other through nonmagnetic layer 70. Thus, the magnetization of each ferromagnetic layer is antiparallel with respect to an adjacent ferromagnetic layer, resulting in a more magnetically stable domain configuration due to a reduction in magnetic energy. It is contemplated that additional magnetic layers alternated with nonmagnetic layers may be used to form laminated top magnetic layer 50.

Figure 4:
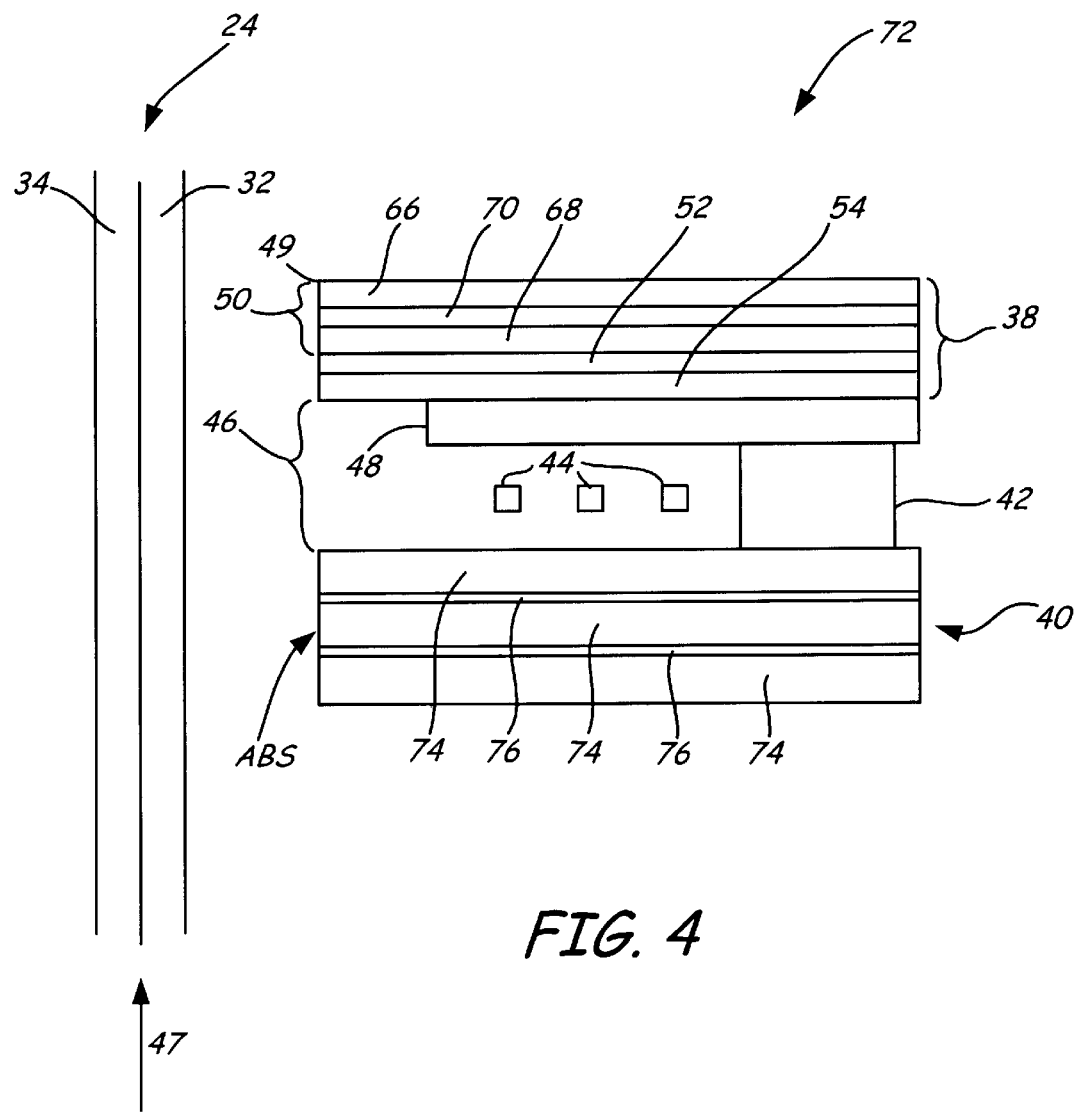
FIG. 4 is a cross-sectional view of a third embodiment of the perpendicular writer of the present invention.

FIG. 4 is a cross-sectional view of a third embodiment of the perpendicular writer 72 of the present invention. In this embodiment, return pole 40 comprises (n) magnetic layers 74 and (n−1) nonmagnetic layers 76 in alternating relationship, where n is an integer equal to or greater than 1. Each magnetic layer 74 is antiferromagnetically coupled to each adjacent magnetic layer 74 through nonmagnetic layer 76. As with main pole 38, this configuration allows return pole 40 to have a high flux carrying capacity while remaining magnetically stable by suppressing the formation of domain walls. This prevents erasure of information of medium 24 by return pole 40.

Any suitable magnetic and nonmagnetic materials may be used for the alternating layers. For magnetic layers 76, a material such as CoNiFe, FeCoN, CoNiFeN, FeAlN, FeTaN, NiFe (e.g. $Ni_{80}Fe_{20}$, $Ni_{45}Fe_{55}$, etc.), NiFeCr, NiFeN, CoZr, CoZrNb, FeAlSi, or similar material may be used, for example. The material is preferably magnetically soft, with a preferred coercivity less than about 5 Oersted and more preferably less than about 1 Oersted. The chosen material preferably has well defined magnetic anisotropic properties, meaning that it has well defined easy and hard magnetic axes. The most preferred materials for magnetic layers 74 are $Ni_{80}Fe_{20}$, CoNiFe, FeCoN, FeAlN, FeAlSi, and FeTaN. In a preferred embodiment, each magnetic layer 74 is made of the same material; however, in an alternate embodiment, magnetic layers 74 may be composed of varying materials.

Nonmagnetic layers 76 may be composed of any nonmagnetic material which is mechanically and chemically compatible with the magnetic materials used for magnetic layers 74. Suitable nonmagnetic materials include, for example, copper, ruthenium, gold, copper-silver alloys, and various oxides, including aluminum oxide and silicon dioxide, for example. In a preferred embodiment, each nonmagnetic layer 76 is made of the same material; however, in an alternate embodiment, nonmagnetic layers 76 may be composed of varying materials.

Because it is not critical for return pole 40 to be thin, greater thicknesses of magnetic materials may be used in return pole 40 compared to main pole 38. The total cross-sectional area at the ABS of all the magnetic layers of return pole 40 is preferably greater than 10 times and more preferably greater than 100 times the total cross-sectional area of all the magnetic layers of main pole 38. It is contemplated that this layered configuration of return pole 40 may be used with a main pole 38 of any configuration.

Although the present invention has been described with reference to preferred embodiments, workers skilled in the art will recognize that changes may be made in form and detail without departing from the spirit and scope of the invention.

What is claimed is:

1. A perpendicular writer having an air bearing surface, the writer comprising:
   a main pole comprising:
      a first magnetic layer having a first magnetic moment;
      a nonmagnetic layer adjacent the first magnetic layer; and
      a second magnetic layer adjacent the nonmagnetic layer, the second magnetic layer having a second magnetic moment, the second magnetic moment being lower than the first magnetic moment, the second magnetic layer being antiferromagnetically coupled with the first magnetic layer;
   a return pole;
   a back gap closure intermediate the main pole and the return pole; and
   a main pole extension layer intermediate the second magnetic layer and the back gap closure, the main pole extension layer being recessed from the air bearing surface.

2. The perpendicular writer of claim 1 wherein:
   the first magnetic layer further comprises a trailing edge, the first magnetic layer being a top magnetic layer;
   the nonmagnetic layer is a nonmagnetic spacer; and
   the second magnetic layer is a magnetic underlayer.

3. The perpendicular writer of claim 1 further comprising:
   a conductive coil positioned at least in part between the main pole and the return pole.

4. The perpendicular writer of claim 1, wherein:
   the first magnetic layer has a first coercivity; and
   the second magnetic layer has a second coercivity, the second coercivity being less than the first coercivity.

5. The perpendicular writer of claim 1 wherein the second magnetic layer and the main pole extension layer are constructed of the same material.

6. The perpendicular writer of claim 1 further comprising:
   a second nonmagnetic layer adjacent the first magnetic layer; and
   a third magnetic layer adjacent the second nonmagnetic layer, the third magnetic layer being antiferromagnetically coupled with the first magnetic layer.

7. The perpendicular writer of claim 1, wherein the nonmagnetic layer has a 111-crystalline orientation.

8. The perpendicular writer of claim 1, wherein the first magnetic layer is composed of an alloy comprising iron and cobalt.

9. The perpendicular writer of claim 1, wherein the nonmagnetic layer is composed of copper.

10. The perpendicular writer of claim 1, wherein the second magnetic layer is composed of an alloy comprising nickel and iron.

11. The perpendicular writer of claim 1, wherein a surface area of magnetic material of the return pole at the air bearing surface is greater than a surface area of magnetic material of the main pole at the air bearing surface.

12. A perpendicular writer having an air bearing surface, the writer comprising:
   a main pole comprising:
      a first magnetic layer having a first magnetic moment;
      a nonmagnetic layer adjacent the first magnetic layer; and
      a second magnetic layer adjacent the nonmagnetic layer, the second magnetic layer having a second magnetic moment, the second magnetic moment being lower than the first magnetic moment, the second magnetic layer being antiferromagnetically coupled with the first magnetic layer;
   a return pole, wherein the return pole further comprises:
      a plurality of magnetic layers; and
      a nonmagnetic layer positioned between each of the plurality of magnetic layers;
      wherein each magnetic layer is antiferromagnetically coupled with each adjacent magnetic layer; and a back gap closure intermediate the main pole and the return pole.

13. A perpendicular writer having an air bearing surface, the writer comprising:
 a main pole comprising:
  a first magnetic layer having a first magnetic moment;
  a nonmagnetic layer adjacent the first magnetic layer;
  a second magnetic layer adjacent the nonmagnetic layer, the second magnetic layer having a second magnetic moment, the second magnetic moment being lower than the first magnetic moment, the second magnetic layer being antiferromagnetically coupled with the first magnetic layer; and
  a main pole extension layer adjacent the second magnetic layer, the main pole extension layer not extending to the air bearing surface;
 a return pole, wherein the return pole further comprises:
  a plurality of magnetic layers; and
  a nonmagnetic layer positioned between each of the plurality of magnetic layers;
  wherein each magnetic layer is antiferromagnetically coupled with each adjacent magnetic layer;
 a back gap closure intermediate the main pole and the return pole; and
 a conductive coil positioned at least in part between the main pole and the return pole.

14. A perpendicular writer having an air bearing surface, the writer comprising:
 a main pole comprising:
  a first magnetic layer having a first magnetic moment;
  a nonmagnetic layer adjacent the first magnetic layer;
  a second magnetic layer adjacent the nonmagnetic layer, the second magnetic layer having a second magnetic moment, the second magnetic moment being lower than the first magnetic moment, the second magnetic layer being antiferromagnetically coupled with the first magnetic layer; and
  a main pole extension layer adjacent the second magnetic layer, the main pole extension layer not extending to the air bearing surface;
 a return pole;
 a back gap closure intermediate the main pole and the return pole; and
 a conductive coil positioned at least in part between the main pole and the return pole.

15. The perpendicular writer of claim 14 wherein the second magnetic layer and the main pole extension layer are constructed of the same material.

16. The perpendicular writer of claim 14 wherein the main pole is a laminated structure, the main pole further comprising:
 a second nonmagnetic layer adjacent the first magnetic layer; and
 a third magnetic layer adjacent the second nonmagnetic layer, the third magnetic layer being antiferromagnetically coupled with the first magnetic layer.

17. The perpendicular writer of claim 14, wherein the second magnetic layer is composed of an alloy comprising nickel and iron.

18. The perpendicular writer of claim 14, wherein the first magnetic layer is composed of an alloy comprising iron and cobalt.

19. The perpendicular writer of claim 14, wherein the nonmagnetic layer is composed of copper.

20. A perpendicular writer having an air bearing surface, the writer comprising:
 a main pole comprising:
  an iron-cobalt alloy layer;
  a copper layer adjacent the iron-cobalt alloy layer; and
  a first nickel-iron alloy layer adjacent the copper layer, the nickel-iron layer being antiferromagnetically coupled with the iron-cobalt layer;
 a return pole;
 a back gap closure intermediate the main pole and the return pole; and
 a second nickel-iron alloy layer intermediate the first nickel-iron alloy layer and the back gap closure, the second nickel-iron alloy layer extending toward but being recessed from the air bearing surface.

* * * * *

UNITED STATES PATENT AND TRADEMARK OFFICE
CERTIFICATE OF CORRECTION

PATENT NO. : 6,791,796 B2
DATED : September 14, 2004
INVENTOR(S) : Alexander Mikhailovich Shukh et al.

It is certified that error appears in the above-identified patent and that said Letters Patent is hereby corrected as shown below:

Title page,
Item [54], Title, delete "PERPENDICULAR WRITER WITH LAMINATED MAIN POLE", insert -- PERPENDICULAR WRITER WITH MAIN POLE EXTENSION LAYER AND ANTIFERROMAGNETICALLY COUPLED LAYERS OF DIFFERING MOMENT --

Signed and Sealed this

Third Day of May, 2005

JON W. DUDAS
*Director of the United States Patent and Trademark Office*